(12) United States Patent
AbdulBaki et al.

(10) Patent No.: US 12,162,254 B2
(45) Date of Patent: Dec. 10, 2024

(54) DEVICE FOR SURFACE COVERING

(71) Applicant: Lowe's Companies, Inc., Mooresville, NC (US)

(72) Inventors: Mansour AbdulBaki, Marietta, GA (US); Blake Gordon, Atlanta, GA (US)

(73) Assignee: Lowe's Companies, Inc., Mooresville, NC (US)

( * ) Notice: Subject to any disclaimer, the term of this patent is extended or adjusted under 35 U.S.C. 154(b) by 443 days.

(21) Appl. No.: 17/478,588

(22) Filed: Sep. 17, 2021

(65) Prior Publication Data

US 2022/0063234 A1 Mar. 3, 2022

Related U.S. Application Data

(63) Continuation of application No. PCT/IB2020/052358, filed on Mar. 16, 2020.
(Continued)

(51) Int. Cl.
*B32B 3/16* (2006.01)
*B32B 3/18* (2006.01)
(Continued)

(52) U.S. Cl.
CPC .................. *B32B 3/16* (2013.01); *B32B 3/18* (2013.01); *B32B 3/266* (2013.01); *B32B 5/18* (2013.01);
(Continued)

(58) Field of Classification Search
CPC .. B32B 3/16; B32B 3/18; B32B 3/266; B32B 5/18; B32B 7/06; B32B 7/12;
(Continued)

(56) References Cited

U.S. PATENT DOCUMENTS 3,077,059 A * 2/1963 Stout ................... E04F 13/0862
52/712
3,425,889 A * 2/1969 Willits, Jr. ............ A47F 5/0815
156/305
(Continued)

FOREIGN PATENT DOCUMENTS

CA 3001045 A1 5/2017
EP 0569921 A1 * 11/1993
(Continued)

OTHER PUBLICATIONS

Machine translation of WO 93/34164 (Year: 1996).*
(Continued)

*Primary Examiner* — Patricia L. Nordmeyer
(74) *Attorney, Agent, or Firm* — Kilpatrick Townsend & Stockton LLP

(57) ABSTRACT

A device includes a substrate (20), a first adhesive (33), and a carrier layer (50). The substrate has a finish layer (40). The substrate has sufficient flexibility to allow manual rolling and to allow manual unrolling without damage. The substrate has a plurality of discontinuous segments (70A, 70B, 70C). The first adhesive is disposed on an opposing side of the finish layer. The first adhesive is configured for pressure sensitive bonding. The first adhesive has a release characteristic such that the substrate can be bonded and disbonded relative to a substantially planar surface and incur no damage. The carrier layer (50) is bonded to the finish layer by a second adhesive (55). The second adhesive is configured to retain the plurality of discontinuous segments infixed spatial alignment. The second adhesive is configured to cleanly disbond from the finish layer by manual peeling.

21 Claims, 3 Drawing Sheets

Related U.S. Application Data

(60) Provisional application No. 62/820,272, filed on Mar. 19, 2019.

(51) Int. Cl.

| | | |
|---|---|---|
| *B32B 3/26* | (2006.01) | |
| *B32B 5/18* | (2006.01) | |
| *B32B 7/06* | (2019.01) | |
| *B32B 7/12* | (2006.01) | |
| *B32B 27/06* | (2006.01) | |
| *B32B 37/12* | (2006.01) | |
| *B32B 37/20* | (2006.01) | |
| *B32B 38/00* | (2006.01) | |
| *E04F 15/02* | (2006.01) | |
| *E04F 15/10* | (2006.01) | |

(52) U.S. Cl.
CPC ............... *B32B 7/06* (2013.01); *B32B 7/12* (2013.01); *B32B 27/06* (2013.01); *B32B 37/12* (2013.01); *B32B 37/203* (2013.01); *B32B 38/145* (2013.01); *E04F 15/0215* (2013.01); *E04F 15/107* (2013.01); *B32B 2255/10* (2013.01); *B32B 2255/102* (2013.01); *B32B 2305/022* (2013.01); *B32B 2307/54* (2013.01); *B32B 2307/542* (2013.01); *B32B 2307/546* (2013.01); *B32B 2307/748* (2013.01); *B32B 2419/04* (2013.01)

(58) Field of Classification Search
CPC ....... B32B 27/06; B32B 37/12; B32B 37/203; B32B 38/145; B32B 2255/10; B32B 2255/102; B32B 2305/022; B32B 2307/54; B32B 2307/542; B32B 2307/546; B32B 2307/748; B32B 2419/04; B32B 2307/4023; B32B 2419/00; B32B 27/08; E04F 15/0215; E04F 15/107; E04F 13/185; E04F 15/105; E04F 13/0885; C09J 7/29
See application file for complete search history.

(56) References Cited

U.S. PATENT DOCUMENTS

| | | | | |
|---|---|---|---|---|
| 3,717,247 | A | * 2/1973 | Moore | E04F 13/16 |
| | | | | 52/390 |
| 4,406,099 | A | 9/1983 | Barrett | |
| 4,543,765 | A | * 10/1985 | Barrett | E04F 15/166 |
| | | | | 52/390 |
| 2005/0016100 | A1 | 1/2005 | Weiss | |
| 2009/0297776 | A1 | 12/2009 | Crosby et al. | |
| 2012/0183726 | A1* | 7/2012 | Calkins | A61B 6/032 |
| | | | | 428/317.1 |
| 2013/0097950 | A1* | 4/2013 | Hunsaker | E04F 13/0733 |
| | | | | 156/289 |
| 2014/0030490 | A1 | 1/2014 | Crosby et al. | |
| 2014/0304953 | A1 | 10/2014 | Crosby et al. | |
| 2014/0305569 | A1 | 10/2014 | Crosby et al. | |
| 2014/0352881 | A1 | 12/2014 | Crosby et al. | |

FOREIGN PATENT DOCUMENTS

| | | | |
|---|---|---|---|
| GB | 2080733 | 2/1982 | |
| WO | WO-9634164 A1 * | 10/1996 | ............... B32B 7/06 |
| WO | 2017084760 | 5/2017 | |

OTHER PUBLICATIONS

Application No. PCT/IB2020/052358, International Search Report and Written Opinion, Mailed On Jun. 22, 2020, 12 pages.
CA3,131,000, "Office Action", Mar. 1, 2024, 4 pages.

\* cited by examiner

DEVICE FOR SURFACE COVERING

CROSS-REFERENCES TO RELATED APPLICATIONS

This application is a claims the benefit of PCT Application No. PCT/IB2020/052358, filed Mar. 16, 2020, which claims the benefit, to U.S. Provisional Patent Application No. 62/820,272, filed Mar. 19, 2019, the entire contents of which are hereby incorporated by reference in their entirety.

TECHNICAL FIELD

This document pertains generally, but not by ways of limitation, to a surface covering assembly configured for covering floors, walls, and other structures.

BACKGROUND

Flooring materials for residential and commercial buildings commonly include tile, wood, vinyl, and carpeting. The materials are typically very heavy and costly to store, transport, and install. In addition, building owners find it costly to satisfactorily replace a segment of an existing floor system. As such, frequently, a floor may remain in service long after the useful life has been exhausted.

Replacing flooring often entails removing existing materials, preparing the sub-surface, and installation of a new surface. Material and labor costs with such projects are often prohibitive. In addition, replacing flooring can be complex (requiring the use of powered equipment) and can expose workers and building occupants to potentially harmful chemicals (including solvents and adhesives).

Documents concerning flooring include the following US publications 2009/0297776A1, 2014/0030490A1, 2014/0352881A1, 2014/0304953A1, and 2014/0305569A1.

SUMMARY

A solution to the challenges associated with replacing existing flooring can include a lightweight, flexible structure that can be easily stored, shipped, and hand-carried to an installation site for installation using common tools and allows for repair or replacement without requiring costly demolition or take-up work and extensive preparation of the subsurface. In one example, an assembly as described herein can be installed over existing flooring without resort to demolition or take-up work.

An example of the present subject matter includes a surface covering assembly which has flexibility to allow rolling a substantial length of material into a convenient form and accommodates packaging in a carton that can be hand-carried.

An example of the present subject matter can be installed and repaired using simple and common tools. The sheet materials of the present subject matter can be cut with a household scissors and bonded in place using a squeegee.

An example of the present subject matter can be repaired by removing and replacing a selected segment from a plurality of segments in a system. An individual segment can be extracted by a peeling motion and replaced or repositioned.

The present inventors have recognized, among other things, that a problem to be solved can include providing a flooring structure having aesthetically appealing segmented features wherein the segments (corresponding to the features) are held in fixed registration by a release liner and wherein the flooring can be bonded to an underlying surface using a pressure sensitive adhesive configured for manual release and repositioning.

In addition to flooring, an example of the present subject matter can be configured for covering a wall, a ceiling, or other surface. As a wall covering, one example entails an assembly that can provide a finish layer that includes a thin section of wood, tile, or stone, or includes fabric, or faithfully simulates a wooden surface, a fabric surface, a tile surface, or a stone surface. In addition, a finish layer of the present subject matter can be configured to present a selected surface or a surface including any combination of simulated materials, such as a first portion simulating wood, a second portion simulating tile, and a third portion simulating stone. Other combinations are also contemplated.

Each of these non-limiting examples can stand on its own or can be combined in various permutations or combinations with one or more of the other examples.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

FIGS. 1A-1F depict a sequence of images representing a manufacturing and installation procedure, according to one embodiment. The figures illustrate a plurality of laminations visible from an edge view. As used herein, the term lamination can be used to refer to an individual ply or to refer to a plurality of plies in an assembly.

Figure 1A:
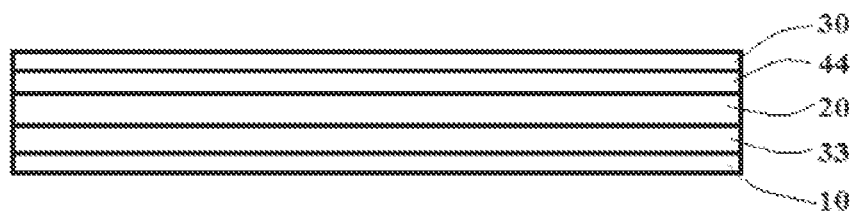
FIGS. 1A-1F depict a sequence of images representing a manufacturing and installation procedure, according to one embodiment.
Figure 1B:
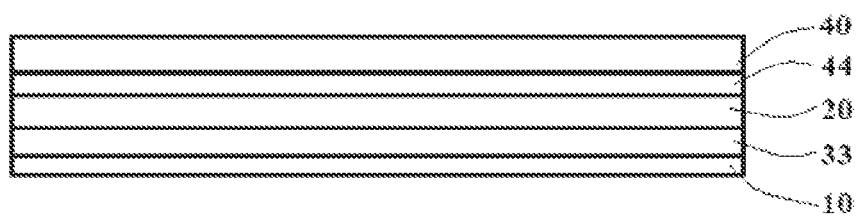

FIG. 1A illustrates a first stack. In the figure, the lamination includes, from bottom to top, protective liner 10, adhesive 33, substrate 20, adhesive 44, and release liner 30.

Protective liner 10 is bonded to a bottom side of substrate 20 by adhesive 33. Protective liner 10 can include a polymer film and is configured to maintain cleanliness of adhesive 33 until exposed at the time of installation. Protective liner 10 is configured to guard adhesive 33 from adhering to a surface during shipping and handling. Protective liner 10 can include a paper-based product or a plastic film such as polyethylene terephthalate (PET), polyethylene (PE), high-density polyethylene (HDPE), or polypropylene (PP).

Adhesive 33 can include a pressure sensitive adhesive. In one example, adhesive 33 is a dry adhesive and can be bonded and later disbonded, and repositioned and bonded again. The adhesive remains bonded to a bottom side of substrate 20 and separates cleanly from protective liner 10.

Adhesive 33 is distributed over all, or over a substantial portion, of the bottom side of substrate 20.

In one example, adhesive 33 is configured to bond with an underlying surface of various materials, including concrete, wood (such as plywood or strand-board), metal, stone, paint, vinyl, linoleum, and carpet (such as wool or other textile materials), and synthetic materials. The adherend, or underlying surface, can be a substantially planar surface.

Adhesive 33, for example, is removable after a lengthy period of bonding (a lengthy period of bonding can be years) and without leaving any residue and without damaging an adherend. In addition, adhesive 33 is repositionable during installation for no less than three hours. Adhesive 33 can be selected to resist lateral shear force associated with lateral loads from, for example, foot traffic or furniture movement. In one example, adhesive 33 has peel and tensile properties (i.e. low peel strength with high shear strength) suitable for the purposes described herein. One example establishes full adhesion strength with low pressure force. One example of adhesive 33 can bond with an underlying surface having a textured surface without prior surface modification (without sealing or smoothing). One example of adhesive 33 remains flexible and enables the assembly to be rolled. One example is selected to resist moisture, tolerate temperature extremes (for indoor environments), and has low volatile organic compounds and low odor. One example is configured to have a lap shear test strength of no less than approximately 335 psi (2,310 kilopascal).

A dry adhesive can form a bond based on a physical adhesion mechanism, for instance, van der Waal forces rather than a wet chemical. A dry adhesive bond is substantially free of a liquid-solid interface. Examples of a liquid-solid interface may include an adhesive glue, a tacky adhesive, and peel-and-stick tape. A dry adhesive allows releasable installation of hard surface tiles or planks. A suitable dry adhesive is light weight and resistant to shear (non-slip with respect to the underlying surface).

In one example, a dry adhesive includes a gecko-like adhesive product using a microscopic hierarchical structure. A dry adhesive can include an adhesive fdm provided on Geckskin® products, made by Felsuma LLC. Other suitable dry adhesive films can include Gecko Nanoplast®, available from Gottlieb Binder GmbH, Setex™ films available from nanoGriptech, and Gecomer® films available from Leibnix-Institut fur neue Materialen.

In one example, adhesive 33 has a dwell time of three or more hours. Dwell time refers to a period of time during which the adhesive is in contact with an adherend and thereafter be peeled from the adherend and reapplied. In one example, adhesive 33 can remain bonded to substrate 20 and underlying surface 80 for an extended period of time and the bond performance (adherence, resistance to peel, or other parameter) may degrade over time.

Substrate 20 can include a layer of film or a layer of foam or it can include a plurality of layers arranged in a laminated configuration having any number of layers wherein the discrete laminations are configured for suitable performance characteristics. Substrate 20 can include a flexible polymeric sheet layer. In one example, substrate 20 includes ornamental features or a wear surface.

The thickness and compression properties of substrate 20 can be selected to suit a particular application. For example, substrate 20 can include a compressible foam material with good recovery and thus provide a flooring assembly having good resilience and providing a comfortable surface for standing and walking. User observable performance (such as comfort, resilience, and leveling qualities) may be affected by underlying substrate 80. As another example, substrate 20 can include a less compressible material and thus provide an assembly having a thinner dimension suitable for covering a wall or cabinet.

Adhesive 44 can include a permanent adhesive. Adhesive 44 can be a wet adhesive. Adhesive 44 remains flexible while wet and flexible when cured to achieve full bonding strength.

Release liner 30 provides protection for adhesive 44. Release liner 30 is configured to guard adhesive 44 from adhering to a surface during shipping and handling. Release liner 30 can include a paper-based product or a plastic film such as polyethylene terephthalate (PET), polyethylene (PE), high-density polyethylene (HOPE), or polypropylene (PP). In one example, the stack in FIG. 1A can be rolled for shipping and handling in which case, either release liner 30 or protective liner 10, can be omitted.

The first stack of laminations shown in FIG. 1A can be referred to as a differential adhesive substrate. As noted, the substrate can include a foam layer or a film layer (such as polyolefin-polyester). The phrase differential adhesive denotes a substrate sandwiched by different adhesives on opposing surfaces. An adhesive on one side of the substrate, here denoted as adhesive 44, is substantially permanent and the adhesive on an opposing side of the substrate, here denoted as adhesive 33, is configured for easy removal. In one example, an easy removal adhesive includes a dry adhesive having a low peel and high shear property.

In one example, adhesive 33 is configured to exhibit a smooth peeling-off quality. An adhesive that peels off smoothly can help avoid wrinkles in a finish layer.

FIG. IB illustrates a second stack corresponding to further processing of the laminations of the first stack. In FIG. IB, release liner 30 has been removed and finish layer 40 has been added. Finish layer 40 can sometimes be referred to as a 'floor'. Adhesive 44 provides a permanent bond between finish layer 40 and substrate 20. In one example, finish layer 40 includes a plurality of laminations including digitally printed ornamental features. In one example, finish layer 40 includes a plurality of performance layers some examples of which can include a print layer, a design layer, a wear layer, a protective layer, or a decorative layer. In other examples, finish layer 40 can include a layer of fabric material as well as other layers, some of which may also be present in substrate 20, such as a core layer, a foam layer, a cushioning layer, or other layers. In one example, finish layer 40 can be textured. For example, finish layer 40 can include a surface having a texture that simulates wood, stone, fabric, or other material.

As shown, FIG. IB includes laminations, from bottom to top, representing protective liner 10, adhesive 33, substrate 20, adhesive 44, and finish layer 40.

Figure 1C:
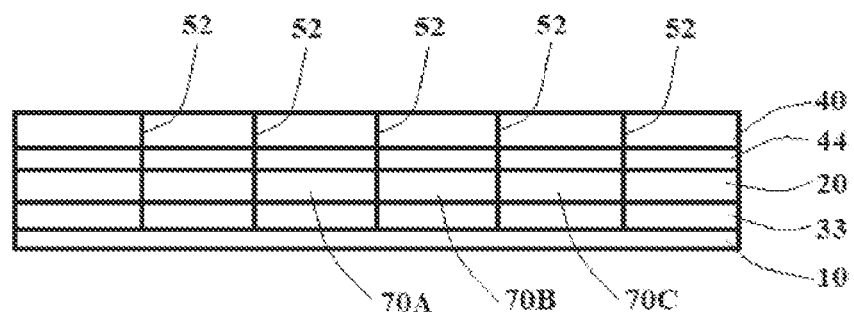
Figure 1D:
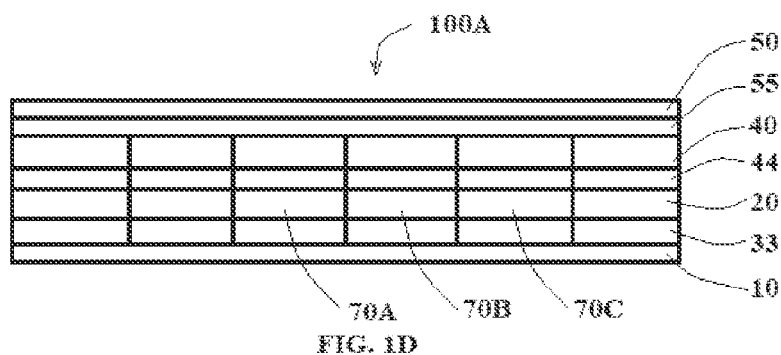
Figure 1E:
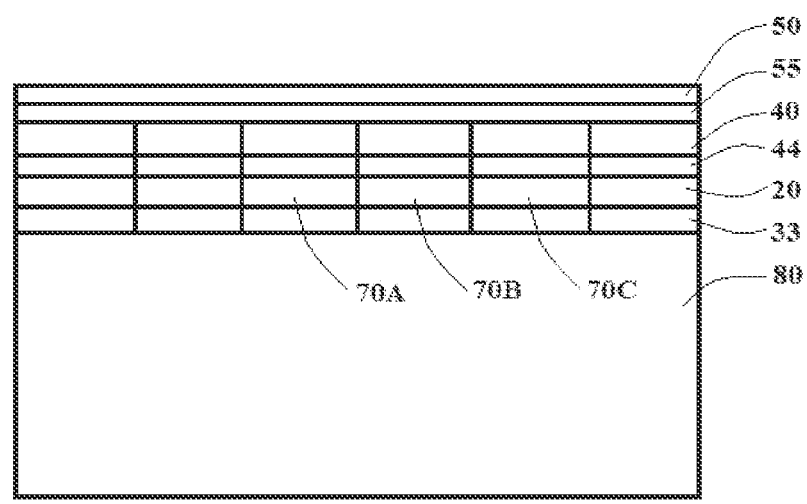
Figure 1F:
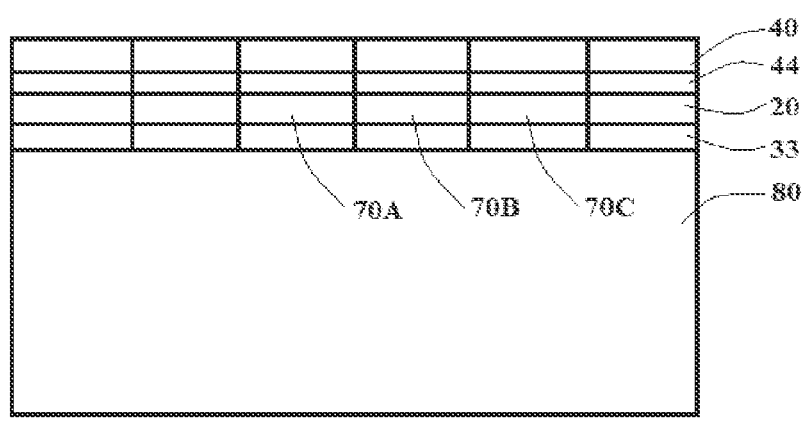

FIG. 1C illustrates a third stack corresponding to further processing of the laminations of the second stack. In FIG. 1C, selected laminations of the stack are cut to form discrete segments. In the figure, a plurality of cut lines 52 extend through finish layer 40, adhesive 44, substrate 20, and adhesive 33. Protective liner 10 remains intact.

Cut lines 52 can be formed by a cutting tool controlled, for example, by a digital processor or by an analog processor. Cut lines shown in the figure are configured for forming an assembly that simulates wood plank flooring. The illustration can be viewed as an assembly having six wood strips covering a width of three feet (approximately one meter). In the figure, the simulated wood strips are depicted as segments, some of which are denoted here as segments 70A, 70B, and 70C. Other configurations are also contemplated.

For example, the stack can be cut in a manner to simulate seams or joints or other decorative details in ceramic tiles or stone. In addition, chamfered edges and other ornamental details can be provided.

As shown, the stack of FIG. 1C includes laminations, from bottom to top, representing protective liner 10, adhesive 33, substrate 20, adhesive 44, and finish layer 40. Segment 70A, for example, includes a portion of finish layer 40 (between adjacent cut lines 52), a portion of adhesive 44, a portion of substrate 20, and a portion of adhesive 33.

FIG. ID illustrates a fourth stack corresponding to further processing of the laminations of the third stack. The stack in FIG. ID is marked as assembly 100A. Assembly 100A denotes a configuration which can be delivered to a job site for installation.

In FIG. ID, carrier layer 50 is bonded to the top side of finish layer 40 by adhesive 55. Carrier layer 50 can include a flexible film (such as a polymer) and adhesive 55 can include a releasable adhesive configured to separate cleanly from finish layer 40.

A releasable adhesive separates cleanly from a first surface, here viewed as finish layer 40, and remains aggressively bonded to a second surface (here viewed as carrier layer 50). In this instance, adhesive 55 separates cleanly from finish layer 40 with a manually applied peeling motion and remains bonded to a bottom side of carrier layer 50. A clean separation leaves little or no residue on the subsurface.

Carrier layer 50 can be viewed as a release liner or a transfer layer. Carrier layer 50 cooperates with adhesive 55 to provide structural strength to assembly 100A and facilitates retention of the individual segments, such as segments 70A, 70B, and 70C, following cutting and before installation of assembly 100A on an underlying surface. The plurality of segments are held in fixed alignment relative to one another, in part, by carrier layer 50 and adhesive 55. Carrier layer 50 can be a continuous sheet or it can be a sheet with a plurality of apertures. The apertures can be perforations.

As shown in the figure, the segments (such as segments 70A, 70B, and 70C) are discontinuous. In one example, the segments are separated by a small dimension gap and the plurality of individual segments are registered, or held in fixed alignment, by protective liner 10 (and adhesive 33) and by carrier layer 50 (and adhesive 55).

As shown, assembly 100A includes laminations, from bottom to top, representing protective liner 10, adhesive 33, substrate 20, adhesive 44, and finish layer 40, adhesive 55, and carrier 50.

One example of assembly 100A has a dimensional width of 36 inches (or approximately one meter) a length of approximately 7-70 meters, and a thickness dimension of approximately 1.75 mm.

At a job site, the installer can layout and cut the length and width dimensions of assembly 100A to fit a particular installation site. Cutting can be performed using a knife, a scissors or other cutting tool.

FIG. IE illustrates a fifth stack corresponding to an installation process in which protective liner 10 has been removed and the stack is bonded to underlying surface 80 by exposed adhesive 33 on the bottom side of substrate 20. In one example, this includes exerting a pressure to form the adhesive bond. In the figure, carrier layer 50 remains bonded to the top side of finish layer 40 by adhesive 55. As shown, adhesive 44 provides a bond between finish layer 40 and substrate 20.

FIG. IF illustrates a sixth stack corresponding to an installation process in which carrier layer 50 and adhesive 55 have been removed, thus exposing finish layer 40. In the figure, the stack remains bonded to underlying surface 80 and the hard surface assembly is ready for service.

As shown in FIG. IF, the laminations, from bottom to top, represent adhesive 33 (bonded to underlying surface 80), substrate 20 (also bonded to adhesive 33), adhesive 44, and finish layer 40.

The stack, as depicted in FIG. IF, can be repaired by selectively removing and replacing a segment, such as segment 70A, 70B, or 70C. For example, segment 70B can be separated from adjacent segments 70A and 70C and segment 70B can be lifted by peeling. Segment 70B can be disbanded from underlying surface 80 at adhesive 33. Adhesive 33 separates cleanly from the top side of underlying surface 80 and remains bonded to the bottom side of substrate 20. After separating segment 70B, a replacement segment can be positioned in the void and can be bonded to the underlying surface 80 by applying pressure to activate the pressure sensitive bond provided by adhesive 33.

Carrier layer 50, adhesive 55, finish layer 40, adhesive 44, substrate 20, adhesive 33, and protective liner 10 are configured to be flexible. In one example, the laminated assembly can be rolled, by hand, into a coil-form without damage to the laminations and without failure of the adhesive layers. In addition, the rolled assembly can be unrolled, by hand, without damage to the laminations and without failure of the adhesive layers. Furthermore, the adhesives are also flexible and are sufficiently strong to retain the unrolled assembly in a substantially planar configuration when properly bonded to an underlying planar structure. In one example, the present subject matter can be described as elastic in the sense that a flooring product, as disclosed herein, provides a resilient surface that rebounds to an original configuration after deflection. In one example, the present subject matter can be described as flexible in the sense that a length of flooring product, as disclosed herein, can be rolled and unrolled by manual manipulation and without resort to tools or machinery.

Figure 2:
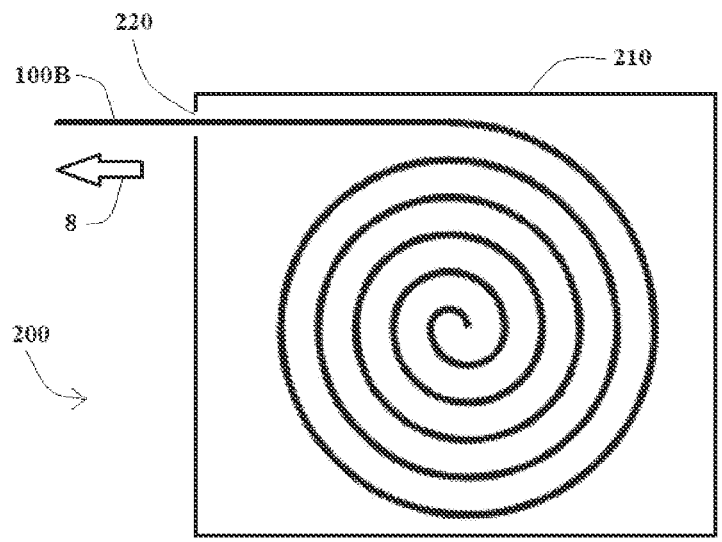
FIG. 2 illustrates a view of a hard surface assembly and a carrier, according to one embodiment.

Assembly 100A, as shown in FIG. ID, can be rolled and packaged in a cardboard carton or carrier, such as that shown in FIG. 2. A rolled assembly can be shipped to a job site for installation.

FIG. 2 illustrates a side view of system 200 including assembly 100B and carrier 210, according to one embodiment. Carrier 210 can include an elongate rectangular-shaped carton manufactured of cardboard, fiberboard, or other lightweight material. Carrier 210 includes aperture 220. In the figure, a portion of assembly 100B is disposed in aperture 220. Aperture 220 can include a rectangular slot for dispensing a length of assembly 100B. In one example, carrier 210 is sized to enclose a rolled supply of assembly 100B. For example, carrier 210 can have an overall length configured to receive a rolled supply having width of 36 inches (approximately one meter) and, when unrolled by withdrawing in the direction shown by arrow 8, assembly 100B has an overall length of 30-70 meters. In one example, carrier 210 is configured for hand-carrying. In one example, the combined weight of carrier 210 and assembly 100B is approximately 36 lbs. (about 16 kg).

Figure 3:
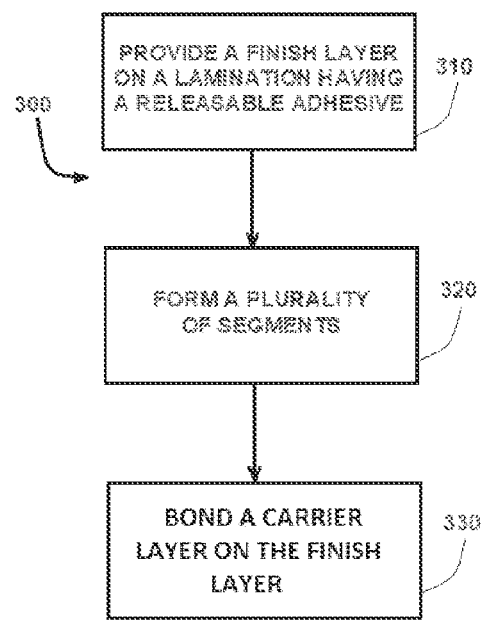
FIG. 3 illustrates a flowchart of a manufacturing method, according to one embodiment.

FIG. 3 illustrates a flowchart for manufacturing method 300, according to one embodiment. At 310, method 300 includes providing a finish layer on a lamination having a releasable adhesive. The substrate has two major surfaces and the finish layer is disposed on a first surface (a first side) of the substrate and the releasable adhesive is disposed on a second surface (a second side) of the substrate. The finish layer can be, for example, formed by printing, coating, embossing, rolling, or cutting. The finish layer can be formed by executing instructions using a digital processor or by operating an analog processor. In various examples, the finish layer can include a wear layer or a gloss layer. In one example, the finish layer is directly coupled to a substrate of foam or film and in another example, the finish layer is bonded to a substrate by a plurality of intervening layers.

At 320, method 300 includes forming a plurality of segments. The segments can be formed from a continuous layer by cutting using an edged tool or by using a laser cutting tool. Forming a plurality of segments can include forming simulated wood planks, simulated tiles, simulated stones, or other features. Forming a plurality of segments can include forming edge details such as a simulated joint, a corner chamfer, a simulated crack, or other features.

At 330, method 300 includes bonding a carrier layer on the finish layer. Bonding the carrier layer can include using a second adhesive. The carrier layer can include a flexible film or sheet. The second adhesive can be a pressure sensitive adhesive configured to disbond or separate cleanly from the finish layer and remain aggressively bonded to the carrier layer. The carrier layer is configured to retain relative positioning of discontinuous segments of the finish layer.

One example of the present subject matter provides an assembly for covering a floor, a wall, or other surface. The assembly can be installed and repaired using common household tools and without using hazardous materials sometimes associated with wet adhesives. One example of the present subject matter can be configured as a covering material for application to a vertically-oriented surface such as a wall surface, window covering, a furniture surface, or a cabinet surface. In addition, an example can be configured for application to a ceiling surface or other surface.

An example of the present subject matter is configured for bonding and disbanding to an underlying surface in a manner that provides a uniformly smooth finish layer. A substrate having a foam layer, in the manner described herein, has sufficient rigidity, elasticity, resilience, and flexibility to provide a uniformly smooth finish layer with good resistance to creasing. A thin flexible film or membrane, on the other hand, may be selected to provide some amount of wrinkling visible on a finish layer for an aesthetic objective. A wrinkled finish layer may be desirable for a particular application. A substrate material can be selected for water repellency. A substrate may be thin and less resilient and be suitable for use in an application calling for greater tactile rigidity.

An example of the present subject matter includes an assembly, or a device comprising a substrate, a first adhesive on a first side of the substrate, and a carrier layer. The substrate can include sheet stock having a finish layer on the second side. The substrate has sufficient flexibility to allow manual rolling and to allow manual unrolling without damage and having a plurality of discontinuous segments.

The first adhesive is disposed on the first side of the substrate. The first adhesive is configured for pressure sensitive bonding. The first adhesive has a release characteristic such that the substrate can be bonded and disbanded relative to a substantially planar surface and incur little or no damage.

The carrier layer includes a flexible film bonded to the finish layer by a second adhesive. The second adhesive is configured to retain the plurality of discontinuous segments in fixed spatial alignment. The second adhesive is configured to cleanly disbond from the finish layer by manual peeling.

In one example, the substrate includes at least one of a foam layer, a polymeric sheet layer, or a film layer.

In one example, the substrate is bonded to the finish layer.

In one example, the finish layer includes at least one of a simulated wood surface, a simulated fabric surface, and a simulated tile surface.

In one example, adjacent discontinuous segments are separated by a simulated flooring joint.

In one example, the plurality of discontinuous segments includes six discrete segments, each of which are configured to simulate a wood plank.

In one example, the finish layer includes a printed image.

In one example, the first adhesive includes a dry adhesive.

In one example, the first adhesive includes a water resistant adhesive.

In one example, a protective liner is bonded to the first adhesive.

In one example, the first adhesive is configured to bond to a surface of at least one of wood, concrete, vinyl, and carpet fiber.

In one example, the carrier layer has a plurality of apertures.

In one example, at least one of the substrate, the first adhesive, and the carrier layer has a width of approximately one meter.

An example of the present subject matter includes a method of manufacturing a surface covering. The method includes providing a finish layer on a top side of a substrate, the substrate having sufficient flexibility to allow manual rolling and to allow manual unrolling without damage, and the finish layer having a plurality of discontinuous segments. The method includes applying a first adhesive on a bottom side of the substrate, the first adhesive configured for pressure sensitive bonding, the first adhesive having a release characteristic such that the substrate can be bonded and disbonded relative to a substantially planar surface and incur little or no damage. The method includes bonding a carder layer of flexible film to the finish layer using a second adhesive, the second adhesive configured to retain the plurality of discontinuous segments in fixed spatial alignment, and wherein the second adhesive is configured to cleanly disband from the finish layer by manual peeling.

In one example, providing the finish layer on the top side of the substrate includes forming at least one of a simulated wood surface, a simulated fabric surface, and a simulated tile surface. In one example, the finish layer includes a section of wood, tile, or stone configured for flexibility. For example, a finish layer can have a thickness dimension and relief features (such as cuts or notches) to allow the assembly to be rolled as described herein.

In one example, providing the finish layer on the top side of the substrate includes forming adjacent discontinuous segments separated by a simulated flooring joint.

In one example, providing the finish layer on the top side of the substrate includes forming a printed image.

In one example, applying the first adhesive includes applying a dry adhesive.

In one example, bonding the carrier layer including bonding a continuous layer.

In one example, a method includes forming a roll of the finish layer, the substrate, the first adhesive, the carrier layer, and the second adhesive.

In one example, a method includes positioning a roll inside of a dispensing carton.

In one example, a method includes positioning a portion of the finish layer, the substrate, the first adhesive, the carrier layer, and the second adhesive within an aperture of the carton.

A device includes an assembly of laminations including a temporary carrier layer, a finish layer, a first permanent adhesive, a substrate, a releasable adhesive layer, and a protective liner. The finish layer incorporates aesthetic and wear performance features suitable to an intended application. The substrate may include a resilient foam layer and has sufficient flexibility to allow manual rolling and to allow manual unrolling without damage. The substrate has a plurality of discontinuous segments. The first permanent adhesive is disposed on an opposing side of the finish layer and bonds the finish layer to the top side of the substrate. The releasable adhesive layer is disposed on the bottom side of the substrate and has a release characteristic such that the substrate can be bonded and disbonded relative to a substantially planar surface and incur little or no damage to either. The carrier layer is a one-sided adhesive sheet or film that is temporarily and releasably affixed to a top side of the finish layer and is configured to retain the plurality of discontinuous segments in fixed spatial alignment. The carrier layer adhesive is configured to hold effectively but cleanly disbond from the finish layer by manual peeling.

Various Notes

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMS), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A device for covering a surface, the device comprising:
a laminated assembly comprising a first adhesive layer, a substrate layer, a second adhesive layer, and a finish layer, wherein the first adhesive layer is disposed on a first side of the substrate layer for use in bonding the laminated assembly to an underlying surface, wherein the first adhesive layer has a release characteristic such that the laminated assembly can be bonded to the underlying surface and then disbonded therefrom without leaving a residue on the underlying surface, wherein the second adhesive layer is disposed on a second side of the substrate layer and between the substrate layer and the finish layer; and wherein at least one or both of the substrate layer and the finish layer of the laminated assembly are divided into discontinuous segments separated by cut lines that extend between the discontinuous segments; and
a carrier layer of flexible film bonded to the finish layer by a third adhesive layer, wherein the third adhesive layer is configured to retain the discontinuous segments in fixed spatial alignment, and wherein the third adhesive layer is configured to cleanly disbond from the finish layer by manual peeling.

2. The device for covering a surface of claim 1 wherein the substrate layer includes at least one of a foam layer, a polymeric sheet layer, or a film layer.

3. The device for covering a surface of claim 1 wherein the substrate layer is bonded to the finish layer by the second adhesive layer.

4. The device for covering a surface of claim 1 wherein the finish layer includes at least one of a simulated wood surface, a simulated fabric surface, and a simulated tile surface.

5. The device for covering a surface of claim 1 wherein adjacent discontinuous segments are separated by a simulated flooring joint.

6. The device for covering a surface of claim 1 wherein the discontinuous segments comprise six discrete segments, each of which is configured to simulate a wood plank.

7. The device for covering a surface of claim 1 wherein the finish layer includes a printed image.

8. The device for covering a surface claim 1 wherein the first adhesive layer includes a dry adhesive.

9. The device for covering a surface of claim 1 further including a protective liner bonded to the first adhesive layer.

10. The device for covering a surface of claim 1 wherein the underlying surface comprises at least one of wood, concrete, vinyl, and carpet fiber.

11. The device for covering a surface of claim 1 wherein the carrier layer has a plurality of apertures.

12. The device for covering a surface of claim 1 wherein the laminated assembly has a width of approximately one meter.

13. A method of manufacturing the device of claim 1, the method including:
   fabricating the laminated assembly; and
   bonding the carrier layer of flexible film to the finish layer using the third adhesive layer.

14. The method of claim 13 wherein fabricating the laminated assembly comprises providing the finish layer with at least one of a simulated wood surface, a simulated fabric surface, and a simulated tile surface.

15. The method of claim 13 wherein adjacent discontinuous segments of the laminated assembly are separated by a simulated flooring joint.

16. The method of claim 13 wherein the finish layer comprises a printed image.

17. The method of claim 13 wherein the first adhesive layer comprises a dry adhesive.

18. The method of claim 13 wherein bonding the carrier layer includes bonding a continuous layer.

19. The method of claim 13 further including forming a roll of the laminated assembly and the carrier layer bonded to the finish layer.

20. The method of claim 19 further including positioning the roll inside of a dispensing carton.

21. The method of claim 20 further including positioning a portion of the laminated assembly and the carrier layer bonded to the finish layer within an aperture of the dispensing carton.

* * * * *